(No Model.)
J. T. MARTIN.
COTTON PICKER.
No. 323,702. Patented Aug. 4, 1885.
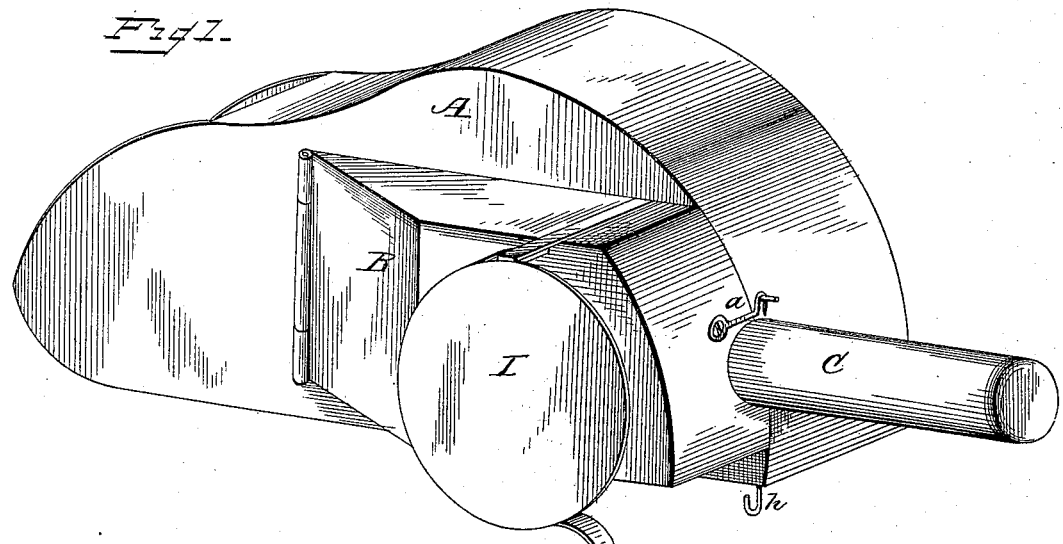
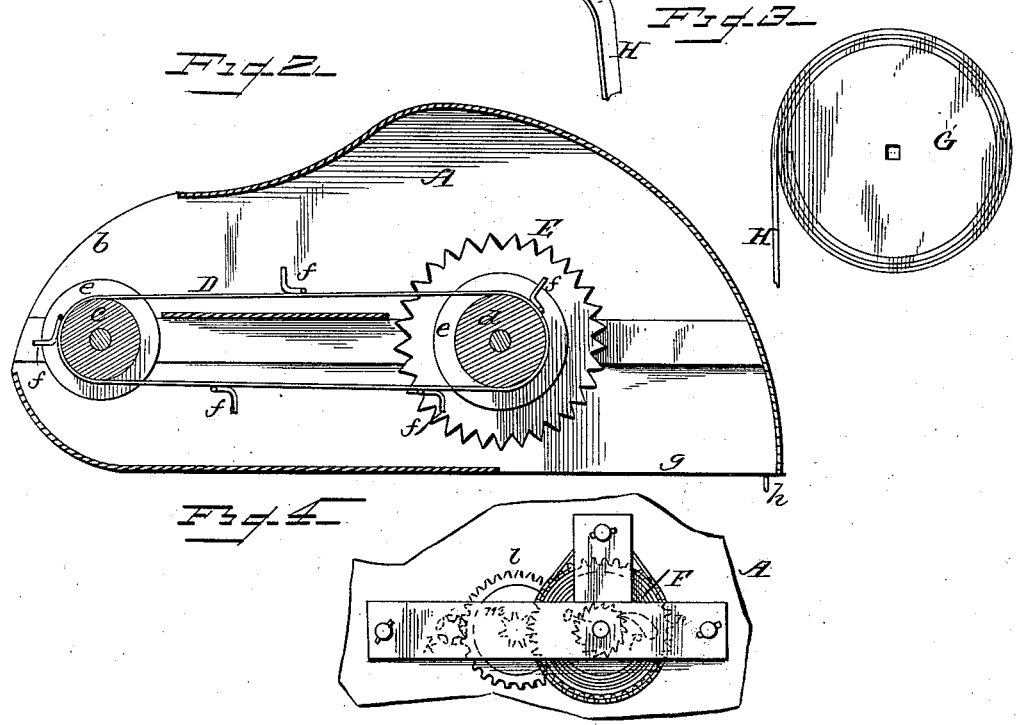
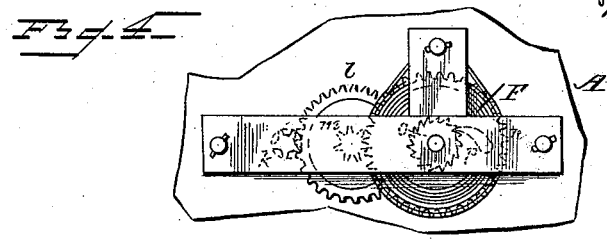
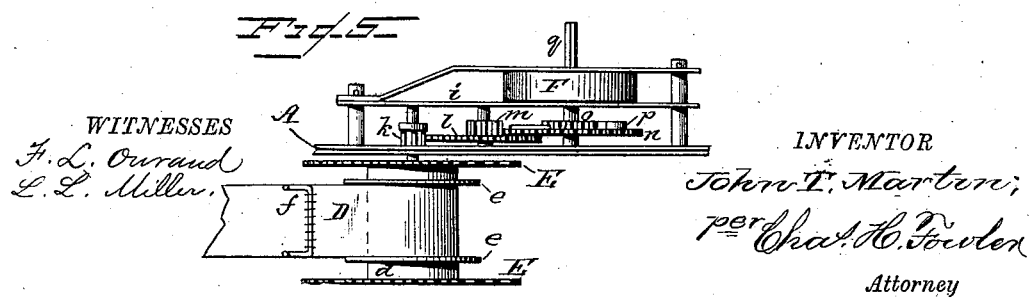
WITNESSES
F. L. Ourand
L. L. Miller
INVENTOR
John T. Martin,
per Chas. H. Fowler
Attorney

UNITED STATES PATENT OFFICE.

JOHN TILLMAN MARTIN, OF ROANOKE, TEXAS.

COTTON-PICKER.

SPECIFICATION forming part of Letters Patent No. 323,702, dated August 4, 1885.

Application filed June 20, 1884. (No model.)

*To all whom it may concern:*

Be it known that I, JOHN T. MARTIN, a citizen of the United States, residing at Roanoke, in the county of Denton and State of Texas, have invented certain new and useful Improvements in Cotton-Pickers; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a longitudinal vertical section thereof; Fig. 3, a detail view of the pulley and belt; Fig. 4, a detail side view of the operating mechanism; and Fig. 5, a top plan view of the same.

The present invention has relation to certain new and useful improvements in cotton-pickers, and the objects thereof are to provide a device or implement simple in its construction and operating mechanism, and effective in use, with comparatively little labor on the part of the operator. These objects I attain by the construction substantially as shown in the drawings, and hereinafter described and claimed.

In the accompanying drawings, A represents the casing, of any desirable form and construction, provided at one of its sides with a hinged hood, B, which incloses the spring-actuating mechanism shown in Figs. 4 and 5, said hood being retained closed by a suitable fastening device, *a*. It will thus be seen that a very simple and convenient means is provided whereby access may be had to the spring-actuating mechanism when desired, without the necessity of taking the implement apart.

The implement is furnished with a suitable handle, C, at one end, and the opposite end of the casing is left open, as shown at *b*, for the reception of the cotton as it is taken from the boll by the picker-teeth upon the endless belt D. The belt D passes around drums *c d*, each having two circumferential flanges, *e*, to hold the belt in place and prevent any lateral displacement, as well as forming guides for the cotton as it passes along on the belt, this being especially the case at the forward end of the belt, where it passes over the drum *c*, preventing, as it does, the cotton from crowding off over the side of the belt.

Connected to the drum *d*, upon the outer sides of the flanges *e*, are toothed disks E, which revolve with the drum, discharge or remove the cotton from the picker-teeth *f*, and thus allow it to fall into a suitable sack or bag attached to the implement around an opening, *g*, by hooks *h*, or any other well-known means. The shaft of the drum *d*, at one end, is of such length as to pass through the side wall of the casing A and a longitudinal brace, *i*, and carries a suitable pinion, *k*, with which engages a gear-wheel, *l*, also provided with a pinion, *m*. This latter pinion meshes with the teeth of a gear-wheel, *n*, provided with a pinion, *o*, with which engages a spring-pawl, *p*. This train of gearing may be variously modified or changed, any suitable clock-gearing being substituted for that shown, and therefore I shall hereinafter refer to it as simply gearing to drive the endless belt when the implement is in use.

The shaft *q*, which carries the gear-wheel *n*, also has attached to it a coiled spring, F, and a pulley, G, keyed or otherwise rigidly secured thereto; and to this pulley is fastened one end of a strap, H, said pulley being incased in a cap, I, connected to the outer side of the hood B, which confines the strap within a certain space, so that it will easily pass around the periphery of the pulley the desired number of times. This strap H is of sufficient length to fasten around the person using the implement, and by taking hold of the handle C the implement is pushed forward in reaching for a boll of cotton. This motion, by means of the strap and gearing, will cause the spring to be wound up, and then, by loosening the hold on the handle and allowing the strap to loosen, the expansive force of the spring will give the required motion to the endless belt, and the picker-teeth thereon, as they come in contact with the boll, will take the cotton therefrom and deposit it in the sack or bag attached to the implement, as hereinbefore described.

Having now fully described my invention, what I claim as new, and desire to secure by Letters Patent, is—

1. A cotton-picker provided with a spring-actuating mechanism located upon the casing, and a hood for inclosing said mechanism hinged to one of the side walls of the casing and held closed by a fastening device, substantially as and for the purpose specified.

2. In a cotton-picker, the casing thereof, the endless picker-belt, flanged drums, and the toothed disks contained within said casing, in combination with a spring-actuating mechanism located upon the outside of the casing, a hinged hood inclosing the mechanism, and a pulley and belt for winding the spring, substantially as and for the purpose specified.

In testimony that I claim the above I have hereunto subscribed my name in the presence of two witnesses.

JOHN TILLMAN MARTIN.

Witnesses:
    C. D. HEFLIN,
    JAMES EADS.